US009915381B2

(12) United States Patent
Doole et al.

(10) Patent No.: US 9,915,381 B2
(45) Date of Patent: Mar. 13, 2018

(54) COMPOSITE TUBE

(71) Applicant: CROMPTON TECHNOLOGY GROUP LIMITED, Banbury, Oxfordshire (GB)

(72) Inventors: Timothy John Doole, Oxford (GB); Darcy John O'Gara, Banbury (GB); Paul Anthony Lewis, Warwick (GB); Michael John Dewhirst, Warwickshire (GB)

(*) Notice: Subject to any disclaimer, the term of this patent is extended or adjusted under 35 U.S.C. 154(b) by 0 days.

(21) Appl. No.: 14/414,311

(22) PCT Filed: Jul. 15, 2013

(86) PCT No.: PCT/GB2013/051881
§ 371 (c)(1),
(2) Date: Jan. 12, 2015

(87) PCT Pub. No.: WO2014/009755
PCT Pub. Date: Jan. 16, 2014

(65) Prior Publication Data
US 2015/0144221 A1    May 28, 2015

(30) Foreign Application Priority Data
Jul. 13, 2012  (GB) .................................. 1212531.6

(51) Int. Cl.
*F16L 9/12*      (2006.01)
*F16L 13/10*     (2006.01)
(Continued)

(52) U.S. Cl.
CPC .............. *F16L 9/12* (2013.01); *B29C 65/483* (2013.01); *B29C 65/542* (2013.01);
(Continued)

(58) Field of Classification Search
USPC .................. 138/109, 155; 285/21.1, 31, 305
See application file for complete search history.

(56) References Cited

U.S. PATENT DOCUMENTS

| 1,251,973 A | 1/1918 | Kurtz |
| 2,460,668 A * | 2/1949 | Wurzburger ............ F16L 13/08 285/21.1 |

(Continued)

FOREIGN PATENT DOCUMENTS

| CN | 202001741 U | 10/2011 |
| FR | 1278914 A | 12/1961 |

(Continued)

OTHER PUBLICATIONS

GB Search report regarding related GB Application No. GB1212531.6; dated Nov. 2, 2012; 3 pages.

*Primary Examiner* — James Hook
(74) *Attorney, Agent, or Firm* — Cantor Colburn LLP

(57) ABSTRACT

A composite tube comprises a first tube section 100 and a second tube section, at least one of which is of fiber reinforced composite form, a mating interface being provided on each of the first and second tube sections, each of the respective mating interfaces having an interfering portion to create an interference fit between the first and second tube sections when the composite tube is assembled, each of the mating interfaces being configured with a recess the recesses being alignable with one another, during assembly, to define a combined recess when the composite tube is assembled, into which a hardened settable compound can be disposed during assembly to form an internal locking element that assists the interference fit by mechanically securing together the first and second tube sections.

17 Claims, 3 Drawing Sheets

(51) Int. Cl.

| | | |
|---|---|---|
| *F16L 13/11* | (2006.01) | |
| *F16L 25/01* | (2006.01) | |
| *F16L 47/24* | (2006.01) | |
| *B32B 37/12* | (2006.01) | |
| *B32B 37/14* | (2006.01) | |
| *B29C 65/48* | (2006.01) | |
| *B29C 65/54* | (2006.01) | |
| *B29C 65/00* | (2006.01) | |

(52) U.S. Cl.
CPC ...... *B29C 66/1222* (2013.01); *B29C 66/1224* (2013.01); *B29C 66/5344* (2013.01); *B29C 66/612* (2013.01); *B29C 66/721* (2013.01); *B29C 66/742* (2013.01); *B32B 37/1292* (2013.01); *B32B 37/142* (2013.01); *F16L 9/125* (2013.01); *F16L 13/103* (2013.01); *F16L 13/11* (2013.01); *F16L 13/116* (2013.01); *F16L 25/01* (2013.01); *F16L 47/24* (2013.01); *B29C 66/7212* (2013.01); *B29C 66/7422* (2013.01)

(56) References Cited

U.S. PATENT DOCUMENTS

| | | | | |
|---|---|---|---|---|
| 2,785,910 A | * | 3/1957 | Munger | B29C 65/54 285/179 |
| 3,606,401 A | * | 9/1971 | Schwarz | B29C 65/54 285/294.4 |
| 3,847,694 A | * | 11/1974 | Stewing | B29C 61/00 156/165 |
| 3,920,268 A | | 11/1975 | Stewing | |
| 4,211,259 A | * | 7/1980 | Butler | B29C 65/42 138/109 |
| 4,647,080 A | | 3/1987 | Sandt et al. | |
| 4,714,377 A | * | 12/1987 | Sandt | F16L 13/11 141/59 |
| 4,876,440 A | * | 10/1989 | Kamath | H05B 3/146 219/528 |
| 4,917,523 A | * | 4/1990 | Merrick | B26F 1/36 283/54 |
| 5,511,831 A | | 4/1996 | Barton | |
| 5,951,812 A | * | 9/1999 | Gilchrist, Jr. | B29C 65/4855 156/304.2 |
| 7,238,256 B2 | * | 7/2007 | Skinner | F16L 9/22 138/155 |
| 2003/0159744 A1 | * | 8/2003 | Sakazaki | F16L 33/01 138/109 |

FOREIGN PATENT DOCUMENTS

| | | |
|---|---|---|
| FR | 2721682 A1 | 12/1995 |
| GB | 2018780 A | 10/1979 |
| JP | S49335 A | 1/1974 |
| JP | S4946215 A | 5/1974 |
| JP | S513024 A | 1/1976 |
| JP | S51087818 A | 7/1976 |
| JP | S54082771 | 7/1979 |
| JP | S57172136 A | 10/1982 |
| JP | S61197224 A | 9/1986 |
| JP | S61218893 A | 9/1986 |
| JP | S631441 B2 | 1/1988 |
| JP | S63167185 A | 7/1988 |
| JP | H04248089 | 9/1992 |
| JP | 2005282637 A | 10/2005 |
| JP | 2009532639 A | 9/2009 |
| NL | 2003773 C | 5/2011 |

\* cited by examiner

COMPOSITE TUBE

This invention relates to a fibre reinforced composite tube, and in particular to a tube to which another tube section, insert or fitting is mounted. The invention further relates to a method of joining such a tube section, insert or fitting and fibre reinforced composite tube section to one another.

In a number of applications it is necessary to join a fibre reinforced composite tube to another part. The said another part may be, for example, a length of another tube or an end fitting or the like, and may be of metallic form. Where it takes the form of a metallic material end fitting, it may carry an O-ring seal, thereby allowing the assembled tube to engage and seal with a further part. Alternatively, the metal end portions may be necessary for compatibility with standard threaded pressure fittings such as flare fittings. Such composite tubes with metal ends may be used as pipes for fluid transport, and it may therefore be necessary that the interface between the metal and composite part provides a secure and sealed structural bond through a range of pressures, temperatures and load conditions. Such tubes are advantageous in that they may be of low weight, for a given strength, and are further advantageous in that electrical conductivity along the tube can be controlled.

A known method for joining a metallic part to a fibre reinforced composite part is to design the parts in such manner that there is a mating interface defining a clearance fit therebetween, and to use adhesive to secure the parts together. The adhesive bond is responsible for mechanically securing the two parts, and for creating a seal at the interface. In such an arrangement, de-bonding at the interface may result in a failure of the seal and/or in mechanical separation under load. Methods of joining that rely on adhesive bonding (for mechanical security and/or sealing) are highly sensitive to the surfaces of the parts to be joined. Contamination and surface roughness may prevent a mechanically robust and sealed joint from being formed, and careful preparation of both parts is therefore necessary. Furthermore, such methods are susceptible to fatigue damage, for instance arising from thermal cycling and vibration.

An alternative method is to use O-rings between the metal and composite parts to provide a seal. This requires a minimum material thickness to allow the necessary grooves to be accommodated. O-ring seals are further susceptible to separation under axial loads.

The thermal coefficients of expansion for fibre reinforced composites and metals are generally not well matched, and differential thermal expansion can result in problems at interfaces between metal and fibre composite parts. A high level of strain may thus be applied to an adhesive bond between the two parts, which may result in premature failure. Differential thermal expansion between the parts may also result in a change in O-ring compression, potentially leading to sealing failures.

There exists a need for an alternative method of joining metal and fibre reinforced composite tubes which avoids the foregoing problems.

According to the present invention, there is provided a composite tube comprising a first tube section and a second tube section, at least one of the tube sections being of fibre reinforced composite form, a mating interface being provided on each of the first and second tube sections, each of the respective mating interfaces having an interfering portion to create an interference fit between the first and second tube sections when the composite tube is assembled, each of the mating interfaces being configured with a recess, the recesses being alignable with one another, during assembly, to define a combined recess when the composite tube is assembled, into which a settable compound can be disposed during assembly to form an internal locking element that assists the interference fit by mechanically securing together the first and second tube sections.

It will be appreciated that in such an arrangement, the mechanical lock formed by the presence of the settable material within the combined recess securely attaches the sections to one another.

The first tube section may be of metallic form. Alternatively is may be of polymeric or fibre reinforced composite form.

The settable compound is conveniently an adhesive.

Each interfering portion is preferably circumferential, and extends substantially parallel to the axis of its respective tube section.

Preferably, the interference fit and/or the settable compound is arranged to provide a fluid seal between the first and second tube sections.

The recess of each mating interface preferably extends continuously around the circumference of each mating interface.

The combined recess is conveniently of substantially circular cross-section. Alternatively, it may be of, for example, substantially dog-bone shaped profile.

At least one mating surface may be provided with a chamfer to assist in assembling the first and second tube sections. At least one of the first and second tube portions may have a stop feature that defines a maximum extent of axial engagement between the first and second tube sections.

The second tube section preferably has an electrical resistance within a predetermined range. For example, the fibres of the second tube section may be non-conducting, and the second tube section may further comprise a predetermined amount of a conductive additive, such as carbon black, distributed therein.

At least one hole may be provided in the first and/or second section for fluid communication with the recess of the assembled tube.

The invention further relates to a method of forming the composite tube comprising assembling the first and second tube sections, and subsequently injecting the settable compound into the recess via the hole.

An alternative method of forming the composite tube in accordance with the invention comprises assembling the first and second tube sections with a settable compound disposed on at least one mating interface thereof, thereby providing lubrication of the mating interfaces and at least partly filling the recess and any surface abrasions during assembly, and wherein during assembly the settable compound is displaced into the recess to fill the recess.

The invention will further be described, by way of example, with reference to the following drawings, in which.

Figure 1:
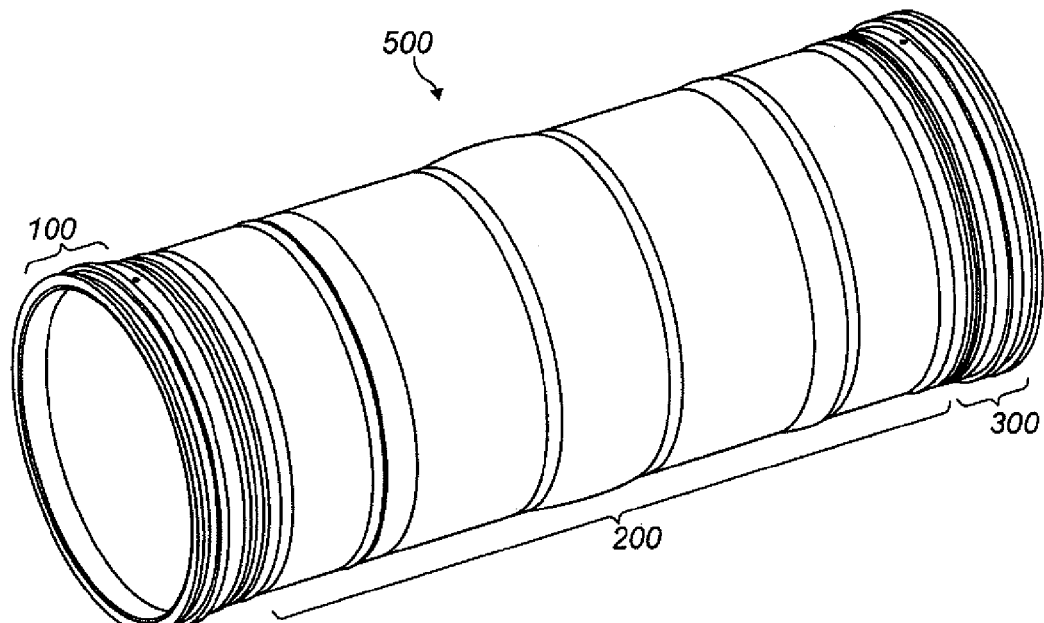
FIG. 1 is a schematic view of an assembled composite tube according to a first embodiment of the invention.

Referring firstly to FIG. 1, an assembled composite tube 500 according to a first embodiment of the invention is shown, comprising a first tube section 100, a second tube section 200 and a third tube section 300. The second tube section 200 comprises a continuous fibre (for example glass or carbon fibre) reinforced polymer composite, and the first and third tube sections 100, 300 are identical metal end sleeves. The tube 500 is suitable for use as a fluid conduit, and a seal is provided at the mating interfaces of the first, second and third tube sections 100, 200, 300. Each of the tube sections 100, 200, 300 is substantially circular in cross section.

Figure 2:
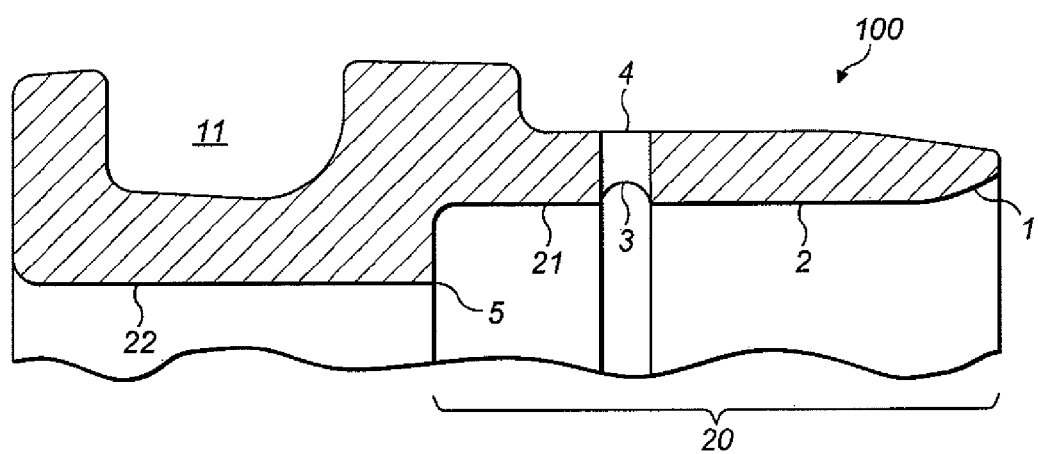
FIG. 2 is a sectional schematic view of a first tube section of the first embodiment.

The metal end sleeve 100 is shown in more detail in FIG. 2, and comprises a mating interface 20, an axial stop feature 5, radial through hole 4 and an external sealing interface 11.

The mating interface 20 is arranged to be adjacent to a corresponding mating interface 30 (see FIG. 3) of the second tube section 200 when the composite tube 500 is assembled. The mating interface 20 of the first tube section 100, which is substantially cylindrical and faces radially inwards, comprises an interfering portion 2 and a clearance portion 21. The interfering portion 2 and clearance portion 21 have substantially the same internal diameter, and are arranged respectively for an interference fit and clearance fit with the substantially cylindrical mating interface of the second tube section 200, which faces radially outwards, as will be further explained below. The clearance portion 21 is towards a first end of the mating interface 20, the first end being remote from the second tube section 200 when the composite tube 500 is assembled. The clearance portion 21 extends up to the axial stop feature 5, which is a radial wall that limits the axial engagement of the first tube section 100 with the second 200. The radial wall of the stop feature 5 extends to a further substantially cylindrical inner surface 22 of the first tube section 100, which has a diameter selected to match the inner diameter of the second tube section 200.

The interfering portion 2 is towards the opposite second end of the mating interface 20, and transitions into a chamfered portion 1 at the second end which slopes so as to flare the opening of the mating interface 20, thereby assisting assembly. The mating interface 20 further comprises a recess 3 between the interfering portion 2 and the clearance portion 21. The profile of the recess 3 is substantially semi-circular, and the recess 3 extends continuously around the full extent of the circumference of the tube section 100.

A radial through hole 4 extends through the wall of the first tube section 100, and is coincident with the recess 3, providing fluid communication thereto. Several such holes 4 may be provided around the first tube section 100.

The external sealing interface 11 is axially offset from the mating interface 20 in a direction away from the second tube section 200 when the composite tube 500 is assembled. This ensures that strains resulting from the external sealing interface 11 do not affect the second tube section 200 or the mating interfaces 20, 30, and further that strains resulting from the interference fit between the first and second tube sections 100, 200 do not affect the external sealing interface 11. The external sealing interface 11 is an O-ring groove which opens radially outwards. The first tube section 100 thereby allows the assembled composite tube 500 to be connected to a further fitting (not shown), with a seal provided by an O-ring located in the groove.

Figure 3:
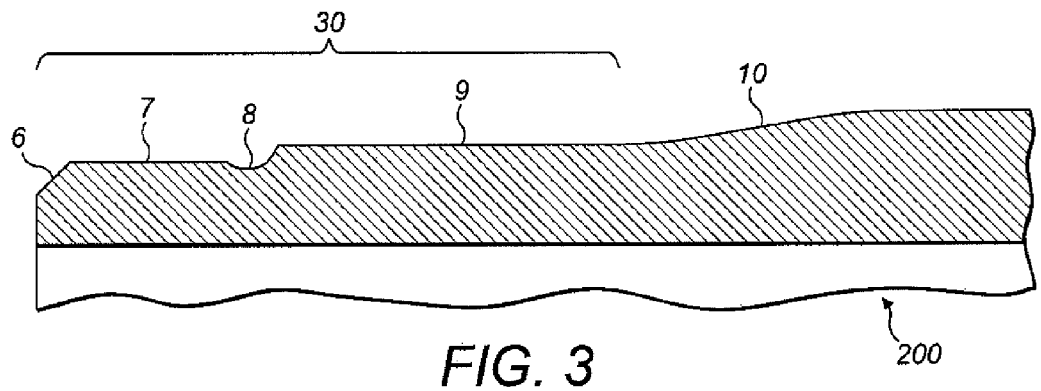
FIG. 3 is a sectional schematic view of a second tube section of the first embodiment.

As shown in FIG. 3, the second tube section 200 comprises a substantially cylindrical mating interface 30 which faces radially outwards. The mating interface 30 of the second tube section 200 comprises an interfering portion 9 and a clearance portion 7. The clearance portion 7 of the second tube section 200 has an external diameter selected for a clearance fit with the internal diameter of the clearance portion 21 of the first tube section 100, and the interference portion 9 of the second tube section 200 has a larger external diameter, selected for an interference fit with the interference portion 2 of the first tube section 100. The interfering portion 9 is towards a first end of the mating interface 30 of the second tube 200, the first end being remote from the first tube section when the composite tube 500 is assembled. The interfering portion 9 transitions into a chamfer 6 at the first end of the mating interface 30. In addition to assisting assembly, the chamfer 6 ensures that the leading edge of the second tube section 200 does not interfere with the fillet radius at the base of the axial stop feature 5.

A recess 8 corresponding with that of the first tube section 100 is provided between the interference portion 9 and clearance portion 7 of the second tube section 200, extending continuously around the full extent of the circumference of the second tube section 200.

Figure 4:
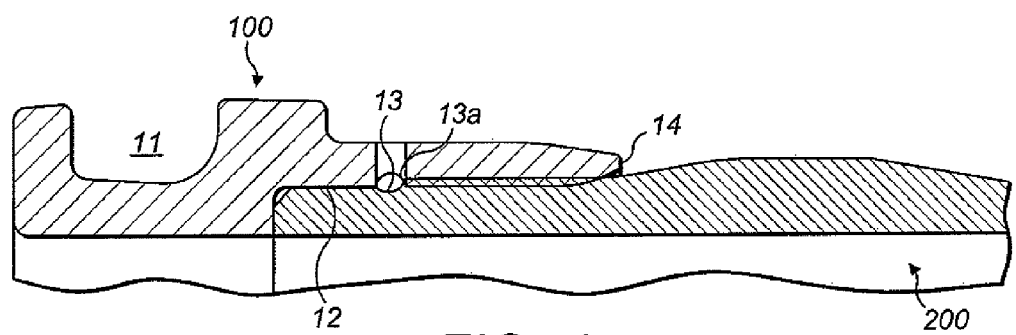
FIG. 4 is a sectional schematic view of the assembled composite tube of the first embodiment.

Referring to FIG. 4, a sectional schematic of the assembled first and second tube sections 100, 200 of the first embodiment is shown, in which the first tube section 100 has been pushed onto the second tube section 200. The respective mating interfaces 20, 30 of the first and second tube section 100, 200 are fully engaged, with the end of the second tube section 200 being butted up against the axial stop feature 5 of the first tube section 100. The respective interfering portions 2, 9, clearance portions 21, 7 and recesses 3, 8 of the first and second tube sections 100, 200 are thereby adjacent and in cooperation.

The compression between the parallel interfering portions 2, 9 mechanically secures the first and second tube sections 100, 200 together, and in this embodiment is sufficient to provide a fluid seal therebetween. The aligned recesses 3, 8 of the first and second tube section 100, 200 form a combined recess 13, which is filled with a hardened/cured settable compound, thereby forming an internal lock ring 13a engaged with both the first and second tube sections 100, 200. The internal lock ring 13a assists the interference fit in securing the first and second tube sections 100, 200 together, and further in providing a fluid seal therebetween. It will be appreciated that the lock ring acts mechanically to lock the first and second tube sections 100, 200 together, and this mechanical lock is independent of any adhesive bond strength. The internal locking ring therefore does not require surface preparation.

The settable compound is preferably adhesive, which may be smeared onto the respective mating surfaces 20, 30 of the first and/or second tube section 100, 200 prior to assembly. The adhesive thereby tends to lubricate the sliding contact between the mating surfaces 20, 30 necessary for assembly of the composite tube 500. It also serves to fill any scratches or roughening which may occur during assembly and so assists in the formation of a fluid tight seal therebetween. Egress of settable compound through the hole 4 during assembly may be used to indicate that the settable compound has filled the combined recess 13. A plurality of through holes 4 may be provided spaced around the circumference to indicate that settable compound has filled the combined recess 13 throughout its circumference.

Alternatively, settable compound may be injected via through hole 4 to fill the combined recess 13 after assembly. At least two through holes 4 are preferably provided for this purpose, so that fluid may be introduced via one hole as it is evacuated by another.

Figure 5:
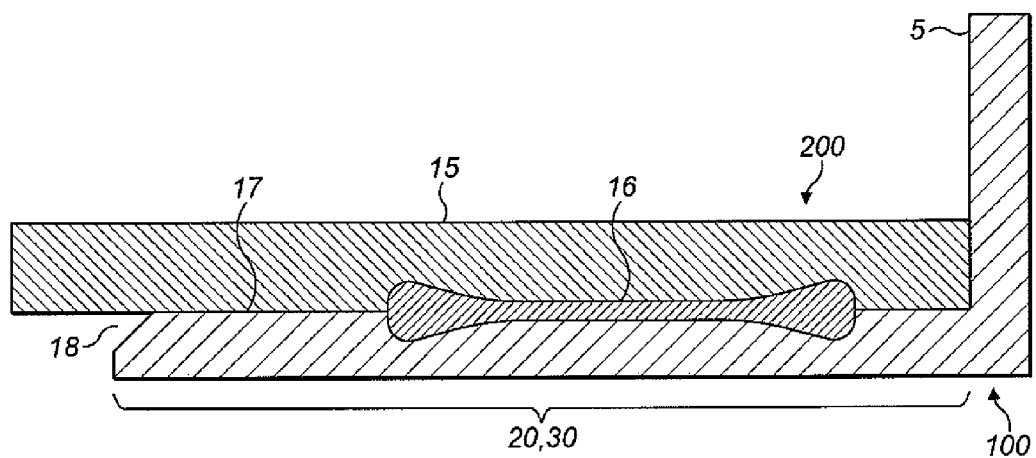
FIG. 5 is a sectional schematic view of a composite tube according to a second embodiment of the invention.

Referring to FIG. 5, a second embodiment is illustrated schematically, comprising a first tube section 100, second tube section 200 and internal lock 16. In this embodiment the first tube section 100 is again metal and the second tube section 200 is a fibre reinforced composite. The first tube section 100 may be suitable for use with a threaded pressure fitting, for example a flare fitting.

In this embodiment, the first tube section 100 has a substantially cylindrical mating interface 20, which faces radially outwards, and the second tube section 200 has a corresponding mating interface 30 facing radially inwards. The substantially parallel mating interfaces 20, 30 are arranged to have an interference fit when assembled, such that the interference fit mechanically secures the first and second sections 100, 200 together and provides a seal therebetween.

Each of the respective mating interfaces 20, 30 have a corresponding recess that together define a circumferential combined recess 16 with a dog bone shaped section, that is to say a section in which a central part thereof is narrower than the end parts thereof, when the first and second tube sections 100, 200 are assembled. The first tube section 100 is provided with an axial stop feature 5 in the form of a radial wall that engages with an end of the first tube section to limit the degree of axial engagement between the first and second tube sections 100, 200. The recesses that comprise the combined recess 16 may thereby be brought into accurate alignment. A chamfer 18 is provided on the leading edge of the first tube section 100, thereby flaring the opening of the mating interface 20 thereof to facilitate assembly.

Following or during assembly, the dog bone shape of the combined recess 16 may be filled with a setting compound, such as adhesive, thereby forming an internal locking feature when cured/hardened. The sectional shape of the combined recess 16 is selected to thereby provide a secure lock, the profile tapering in both directions to similarly resist axial movement in both directions. The adhesive may be injected into the recess 16 after assembly via through holes (not shown), or could be smeared onto the mating surfaces 20, 30 prior to assembly as described hereinbefore, thereby tending to fill the recess 16 during assembly. It will be appreciated that the internal locking feature thereby formed is a mechanical lock which does not rely on adhesive bonding to function, and is thereby independent of any adhesive bond strength. It is therefore insensitive to surface preparation (or lack thereof) of the mating surfaces 20, 30.

In the case of small diameter tubing, wherein the first and second tube section 100, 200 comprise relatively compliant materials such as aluminium and glass fibre reinforced polymer respectively, it may not be necessary to apply adhesive during assembly. For larger diameter tubing, wherein the first and second tube section 100, 200 comprise stiffer materials such as steel and carbon fibre reinforced polymer respectively, at least a thin smear of adhesive may be applied to the mating surface before the first and second tube 100, 200 are pressed together. Such larger tubing may require a greater radial interference to create the same press fit pressure, which may result in abrasion and/or micro-cracking of the surface. This may in turn provide a leak path at the interface. Applying adhesive during assembly tends to reconstitute the mating interface of the tube sections 100, 200 at a micro-level.

Note that although adhesive is preferable, the bonding mechanism of the adhesive (which is sensitive to surface preparation) is not required to seal, and therefore surface preparation may not be necessary.

Both of the example embodiments provide a join between a metal tube section and a composite tube section that is mechanically robust, and which has a secure fluid seal at the interface. Neither the mechanical securing nor the sealing rely on adhesive bonding, and this approach is therefore highly resistant to fatigue stressing. The radial interference and the elasticity of the components ensure that a press fit is maintained at high or low pressures, regardless of any adhesive de-bonding that may occur.

Further, the combination of interference and elasticity may offset the effects of differential coefficients of thermal expansion between the respective parts. The press fit between the first and second tube sections also maintains electrical continuity through the part, which eliminates the need for conductive leads.

Figure 6:
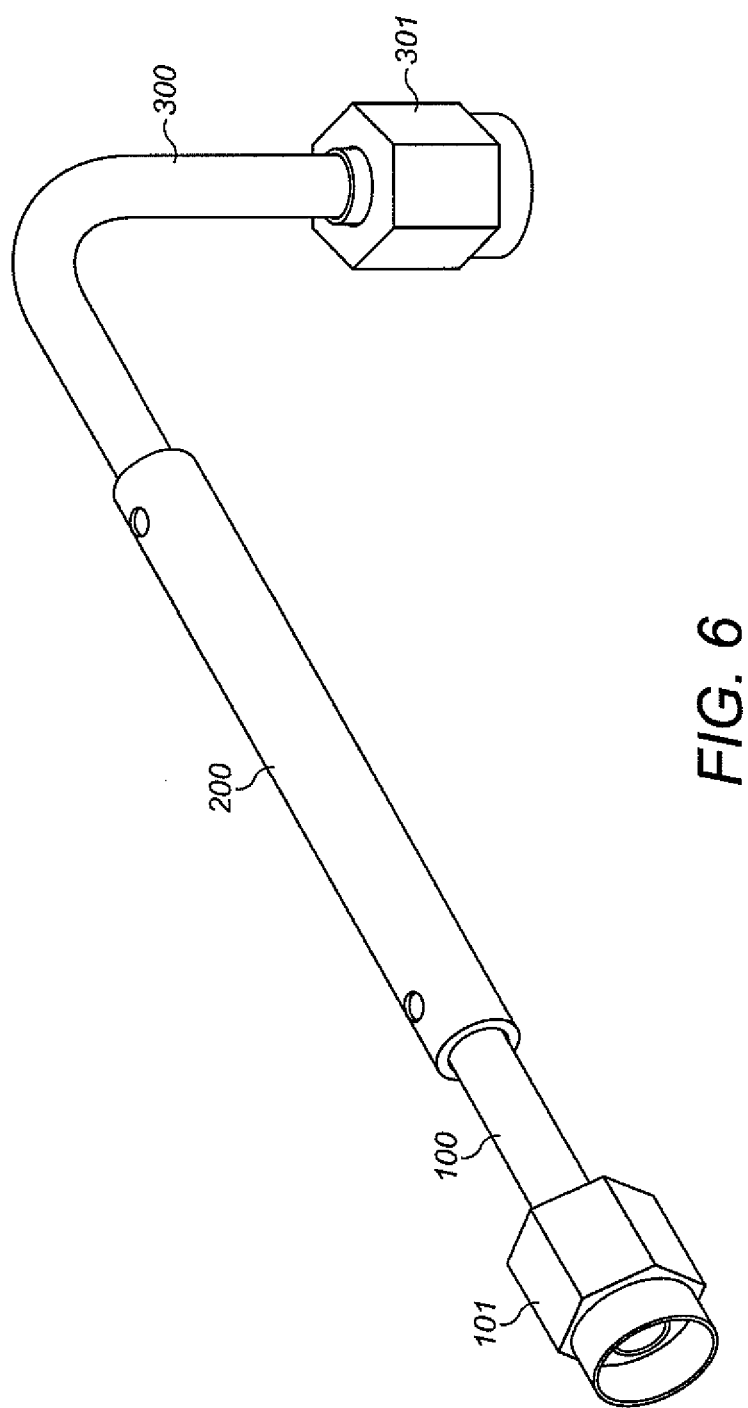
FIG. 6 is a schematic view of a composite tube according to a third embodiment of the invention.

An example application in which the invention is useful is for attaching aluminium pipes to glass fibre reinforced polymer bodies, as shown in FIG. 6. The embodiment of FIG. 6 comprises a central glass fibre reinforced polymer tube section 200, which is joined at a first end to a first aluminium tube section 100, and at a second end to a second aluminium tube section 300. Each of the aluminium end sections is provided with a respective flare fitting 101, 301 so that the embodiment may be coupled to external pressure fittings (not shown) at either end.

Such an embodiment may provide a specific electrical resistance, for instance to prevent a large flow of current through a fuel system during a lightning strike whilst also preventing the build up of static. To achieve this, a second tube section comprising non-conducting fibre reinforcement may be infused with a predetermined amount of a conductive additive such as carbon black. To ensure continuity through the assembled composite tube, the settable compound may also be conductive, and may for instance comprise an adhesive similarly infused with a conductive additive.

Such fittings typically see operating pressures of approximately 55 psi (379 kPa), maximum pressures of approximately 280 psi (1931 kPa) and are required to have an ultimate pressure of 350 psi (2413 kPa). During installation, parts can see torque loading due to tightening of the nut and unions, as well as sudden axial loads due to mishandling. Once fitted, the part has to resist vibrations present during aircraft operation, dynamic pressures and extreme temperatures (−55° C. to +85° C.).

Although embodiments with circular tube sections have been described, embodiments are contemplated with other tube sections, for example elliptical. In each of the example embodiments the interface between the first and second tube is sealed, but this is not an essential feature of the invention. Furthermore, it will be apparent that the invention is applicable to arrangements in which the first tube section is of smaller diameter and located within part of the second tube section, and to arrangements in which the first tube section is located externally of the second tube section.

Whilst the description hereinbefore is directed primarily towards arrangements in which a metallic material tube section is secured to a composite material tube section, the invention may also be applied in the securing of, for example, a first tube section of polymeric or fibre reinforced composite material form to a second tube section of composite form.

Whilst specific embodiments of the invention are described hereinbefore, it will be appreciated that a number of modifications and alterations may be made thereto without departing from the scope of the invention.

The invention claimed is:

1. A composite tube comprising a first tube section and a second tube section, at least one of the tube sections being of fibre reinforced composite form, a mating interface being provided on each of the first and second tube sections, each of the respective mating interfaces having an interfering portion and a clearance portion to respectively create an interference fit and a clearance fit between the first and second tube sections when the composite tube is assembled, each of the mating interfaces being configured with a recess, the recesses being arranged between the respective interfering portion an clearance portion on each mating surface, and being alignable with one another, during assembly, to define a combined recess when the composite tube is assembled, into which a settable compound can be disposed during assembly to form an internal locking element that assists the interference fit by mechanically securing together the first and second tube sections.

2. A composite tube according to claim 1, wherein the settable compound is an adhesive.

3. A composite tube according to claim 1, wherein each interfering portion is circumferential, and extends substantially parallel to the axis of its respective tube section.

4. A composite tube according to claim 1, wherein the interference fit and/or the settable compound is arranged to provide a fluid seal between the first and second tube sections.

5. A composite tube of according to claim 4, wherein the recess of each mating interface extends continuously around the circumference of each mating interface.

6. A composite tube according to claim 1, wherein at least one mating surface is provided with a chamfer to assist in assembling the first and second tube sections.

7. A composite tube according to claim 1, where at least one of the first and second tube portions has a stop feature that defines a maximum extent of axial engagement between the first and second tube sections.

8. A composite tube according to claim 1, wherein the second tube section has an electrical resistance within a predetermined range.

9. A composite tube according to claim 8, wherein the fibres of the second tube section are non-conducting, and the second tube section comprises a predetermined amount of a conductive additive distributed therein.

10. A composite tube according to claim 9, wherein the conductive additive is carbon black.

11. A composite tube according to claim 1, wherein a hole is provided in the first and/or second section for fluid communication with the recess of the assembled tube.

12. A method of forming the composite tube of claim 11, comprising assembling the first and second tube sections, and subsequently injecting the settable compound into the recess via the hole.

13. A composite tube according to claim 1, wherein the first tube section is of metallic form and the second tube section is of fibre reinforced composite form.

14. A composite tube according to claim 1, wherein the first tube section is of polymeric or fibre reinforced composite material form and the second tube section is of fibre reinforced composite form.

15. A composite tube according to claim 1, wherein the combined recess is substantially circular in cross-section.

16. composite tube according to claim 1, wherein the combined recess has a substantially dog-bone shaped profile.

17. A method of forming the composite tube of claim 1, comprising assembling the first and second tube sections with a settable compound disposed on at least one mating interface thereof, thereby providing lubrication of the mating interfaces and at least partly filling the recess during assembly, and wherein during assembly the settable compound is displaced into the recess to fill the recess.

* * * * *